United States Patent
Baek et al.

(10) Patent No.: US 12,524,966 B1
(45) Date of Patent: Jan. 13, 2026

(54) SYSTEM AND METHOD FOR GENERATING CUSTOMIZED DESIGN FOR BRAND BASED ON ARTIFICIAL INTELLIGENCE

(71) Applicant: StyleAI Inc., Daejeon (KR)

(72) Inventors: Ha Jeong Baek, Gyeonggi-do (KR); Sang Ho Nam, Seoul (KR)

(73) Assignee: StyleAI Inc., Daejeon (KR)

( * ) Notice: Subject to any disclaimer, the term of this patent is extended or adjusted under 35 U.S.C. 154(b) by 0 days.

(21) Appl. No.: 19/261,069

(22) Filed: Jul. 7, 2025

(30) Foreign Application Priority Data

Oct. 7, 2024 (KR) .......... 10-2024-0135410

(51) Int. Cl.
*G06T 19/00* (2011.01)

(52) U.S. Cl.
CPC .......... *G06T 19/00* (2013.01); *G06T 2200/24* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 9,292,162 | B2* | 3/2016 | Topakas | G06F 16/583 |
| 12,288,242 | B2* | 4/2025 | Konakalla | G06Q 30/0629 |
| 2016/0050221 | A1* | 2/2016 | Myslinski | G06F 16/248 |
| | | | | 726/22 |
| 2019/0236098 | A1* | 8/2019 | Bhotika | G06F 16/287 |
| 2020/0273093 | A1* | 8/2020 | Mitchell | G06F 3/0482 |
| 2025/0069343 | A1* | 2/2025 | Sholl | G06V 10/454 |

FOREIGN PATENT DOCUMENTS

| | | |
|---|---|---|
| KR | 10-2503580 B1 | 2/2023 |
| KR | 10-2700845 B1 | 8/2024 |

OTHER PUBLICATIONS

Kyunghee Chung et al., "A Case Study of Human-AI Co-Creation (HAIC) in Fashion Design", Journal of Fashion Business, Sep. 2023, vol. 27, No. 4, pp. 141-162, DOI:10.12940/jfb.2023.27.4.141 (English translation is also submitted herewith.).

Seyoon Jang et al., "Deep Learning for Classification of High-End Fashion Brand Sensibility", Journal of the Korean Society of Clothing and Textiles, 2022, vol. 46, No. 1, pp. 165-181, DOI: 10.5850/JKSCT.2022.46.1.165 (English translation is also submitted herewith.).

Jung, Ju-ri et al., " A Study on AI-based Design Process Innovation in Fashion Industry", Journal of Communication Design, Apr. 30, 2019, vol. 67, pp. 140-153, DOI : 10.25111/jcd.2019.67.11 (English translation is also submitted herewith.).

* cited by examiner

*Primary Examiner* — Saptarshi Mazumder
(74) *Attorney, Agent, or Firm* — The PL Law Group, PLLC

(57) ABSTRACT

A system for generating a customized design for a brand based on artificial intelligence makes it possible to learn a unique brand style for each brand and then automatically generate a user prompt based on a brand selected by a user, and automatically generate and suggest a new clothing image by comprehensively considering the selected brand, the user prompt, and trend data.

12 Claims, 11 Drawing Sheets

FIG. 9

Brand A

BRAND POSITIONING STATEMENT:
Brand A is feminine versatile style that creates fit solutions that flatters for a wear to work lifestyle with comfort and ease.

CUSTOMER SEGMENT: 35 – 65
STYLE PROFILE: VERSATILE WEAR TO WORK
VALUE POSITIONING: GOOD

THE BRAND IS
- POLISHED CASUAL
- MODERN FEMINNE
- WEAR TO WORK
- VERSATILE
- DESTINATION FOR FIT SOLUTIONS

THE BRAND IS NOT
- CONSERVATIVE
- SWEET GIRLY
- OCCASION-SPECIFIC
- CASUAL
- TRICKY

COMPETITIVE BENCHMARK
- Brand B
- Brand C

INSPIRATIONAL BENCHMARK
- Brand D
- Brand E
- Brand F

FAMOUS FOR/KEY CATEGORIES
- NON-DENIM BOTTOMS
- BLAZERS
- KNIT ESSENTIALS
- BLOUSES
- SWEATERS

SYSTEM AND METHOD FOR GENERATING CUSTOMIZED DESIGN FOR BRAND BASED ON ARTIFICIAL INTELLIGENCE

CROSS-REFERENCE TO RELATED APPLICATION AND CLAIM OF PRIORITY

This application claims the benefit under 35 USC § 119 of Korean Patent Application No. 10-2024-0135410, filed on Oct. 7, 2024 in the Korean Intellectual Property Office, the entire disclosure of which is incorporated herein by reference for all purposes.

BACKGROUND

Embodiments of the present disclosure relate to technology for generating a customized design for a brand based on artificial intelligence, and more specifically, to technology for automatically generating and suggesting ideas and images of new clothing designs by comprehensively considering brand clothing images, competitor data, trend data, and the like through the inference function of an artificial intelligence model (e.g., Chain of Thought of OpenAI o1).

In the related art, in order to generate a single design, several steps were taken, including design drawing, pattern design production, 3D design, sample production, work instruction production, product production, and the like, and there is a problem in that going through each of these steps takes a lot of time, at least two to three weeks.

In addition, in the related art, new designs are produced by relying on the creativity of designers, resulting in problems such as limitations in generating new designs and cost burdens due to the high labor cost of designers. Furthermore, in a process of producing a new design, there is the inconvenience of having to repeatedly performing the process of producing a new design again every time an element of the new design is modified, which results in problems such as an excessive increase in the cost and time of producing a new design.

Examples of the related art include Korean Patent Registration No. 10-2503580 (Date: Feb. 21, 2023).

SUMMARY

The present disclosure is to learn a unique style of a brand and then automatically generate a brand customized design based on the learned unique style.

In addition, the present disclosure is to reflect trend data related to a brand and user prompts in a process of generating a brand customized design.

In particular, the present disclosure is to provide an artificial intelligence model that generates and suggests ideas and images of new clothing designs on its own by comprehensively considering the collected information, rather than simply searching for related information, through more in-depth thinking compared to existing models, and a service using the same.

According to one embodiment, there is provided a system for generating a customized design for each brand based on artificial intelligence including a brand learning unit configured to learn a unique brand style for each brand based on a plurality of clothing images of each brand, a brand selection unit configured to allow a user to select one of the plurality of brands, a prompt generation unit configured to automatically generate a user prompt required to generate a new clothing image based on the selected brand (and a competitor brand corresponding to the selected brand), a clothing image generation unit configured to automatically generate a first new clothing image based on a set artificial intelligence model, training data corresponding to the selected brand, and the user prompt, and a trend data retrieval unit configured to retrieve a plurality of pieces of trend data based on the selected brand and the user prompt, in which the clothing image generation unit automatically generates a second new clothing image by modifying the first new clothing image so that the trend data is reflected through the artificial intelligence model.

The brand learning unit may collect the plurality of clothing images for each brand as the training data and stores the clothing images in each set brand database, generate a new brand clothing image for each brand from the plurality of clothing images stored in each brand database, and store the new brand clothing image as the training data in the brand database corresponding to the new brand clothing image based on a similarity between the new brand clothing image and the plurality of clothing images stored in the brand database corresponding to the new brand clothing image.

The brand learning unit may receive user feedback including scoring information or grouping information for the new brand clothing image and determines the similarity based on the user feedback, the scoring information may be an indicator quantitatively indicating how well the new brand clothing image is aligned with the unique brand style, and the grouping information may be an indicator indicating whether the new brand clothing image is groupable into a group having the same style as the plurality of clothing images stored in the brand database.

The prompt generation unit may select and output a plurality of different clothing images corresponding to the selected brand, receive a selection from the user for one of the plurality of output clothing images, and automatically generate the user prompt based on the selected clothing image.

The prompt generation unit may extract a plurality of properties of the selected clothing image and automatically generate the user prompt from a combination of keywords for the properties of the extracted clothing image.

The prompt generation unit may receive, from the user, a modification command for at least one of the plurality of keywords included in the user prompt or an additional command for a new keyword and regenerates the user prompt.

The plurality of pieces of trend data may include at least one of fashion show trend data, paper trend data, magazine trend data, competitor trend data, social network service (SNS) trend data, and blog trend data related to the selected brand or the plurality of keywords included in the user prompt.

The trend data retrieval unit may dynamically change retrieval criteria or retrieval priorities for the plurality of pieces of trend data according to the selected brand.

The trend data retrieval unit may receive a selection from the user for one of the plurality of pieces of trend data, and the clothing image generation unit may automatically generate the second new clothing image based on the pieces of trend data selected from the user through the artificial intelligence model.

The clothing image generation unit may derive main keywords corresponding to the selected brand in order to determine brand aesthetics of the selected brand and perform an open space analysis based on the derived main keywords and competitor trend data included in the plurality of pieces of trend data, thereby determining a brand gap of the selected brand and automatically generating the second new clothing image corresponding to the brand gap.

According to another embodiment, there is provided a method for generating a customized design for each brand based on artificial intelligence, including learning, by a brand learning unit, a unique brand style for each brand based on a plurality of clothing images of each brand, allowing, by a brand selection unit, a user to select one of the plurality of brands, automatically generating, by a prompt generation unit, a user prompt required to generate a new clothing image based on the selected brand, generating, by a clothing image generation unit, a first new clothing image based on a set artificial intelligence model, training data corresponding to the selected brand, and the user prompt, retrieving and outputting, by a trend data retrieval unit, a plurality of pieces of trend data based on the selected brand and the user prompt, receiving, by the trend data retrieval unit, a selection from the user for one of the plurality of pieces of output trend data, and automatically generating, by the clothing image generation unit, a second new clothing image by modifying the first new clothing image so that the trend data is reflected through the artificial intelligence model.

The learning of the unique brand style for each brand may include collecting a plurality of clothing images for each brand as the training data and storing the clothing images in each set brand database, generating a new brand clothing image for each brand from the plurality of clothing images stored in each brand database, and storing the new brand clothing image as the training data in the brand database corresponding to the new brand clothing image based on a similarity between the new brand clothing image and the plurality of clothing images stored in the brand database corresponding to the new brand clothing image.

The learning of the unique brand style for each brand may include receiving user feedback including scoring information or grouping information for the new brand clothing image and determining the similarity based on the user feedback, the scoring information may be an indicator quantitatively indicating how well the new brand clothing image is aligned with the unique brand style, and the grouping information may be an indicator indicating whether the new brand clothing image is groupable into a group having the same style as the plurality of clothing images stored in the brand database.

The automatic generation of the user prompt may include selecting and outputting a plurality of different clothing images corresponding to the selected brand, receiving a selection from the user for one of the plurality of output clothing images, and automatically generating the user prompt based on the selected clothing image.

The automatic generation of the user prompt may include extracting a plurality of properties of the selected clothing image and automatically generating the user prompt from a combination of keywords for the properties of the extracted clothing image.

The automatic generation of the user prompt may include receiving, from the user, a modification command for at least one of the plurality of keywords included in the user prompt or an additional command for a new keyword and regenerating the user prompt.

The plurality of pieces of trend data may include at least one of fashion show trend data, paper trend data, magazine trend data, competitor trend data, social network service (SNS) trend data, and blog trend data related to the selected brand or the plurality of keywords included in the user prompt.

The retrieving of the plurality of pieces of trend data may include dynamically changing retrieval criteria or retrieval priorities for the plurality of pieces of trend data according to the selected brand.

The retrieving of the plurality of pieces of trend data may include receiving a selection from the user for one of the plurality of pieces of trend data, and the generating of the second new clothing image may include automatically generating the second new clothing image based on the pieces of trend data selected from the user through the artificial intelligence model.

The generating of the second new clothing image may include deriving main keywords corresponding to the selected brand in order to determine brand aesthetics of the selected brand, and performing an open space analysis based on the derived main keywords and competitor trend data included in the plurality of pieces of trend data, thereby determining a brand gap of the selected brand and automatically generating the second new clothing image corresponding to the brand gap.

BRIEF DESCRIPTION OF THE DRAWINGS

Exemplary embodiments can be understood in more detail from the following description taken in conjunction with the accompanying drawings, in which:

FIG. 9 is a view showing an example of deriving main keywords for determining brand aesthetics in the clothing image generation unit according to an embodiment of the present disclosure;

DETAILED DESCRIPTION OF THE EMBODIMENTS

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice, the intention of a user or operator, or the like. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", or the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
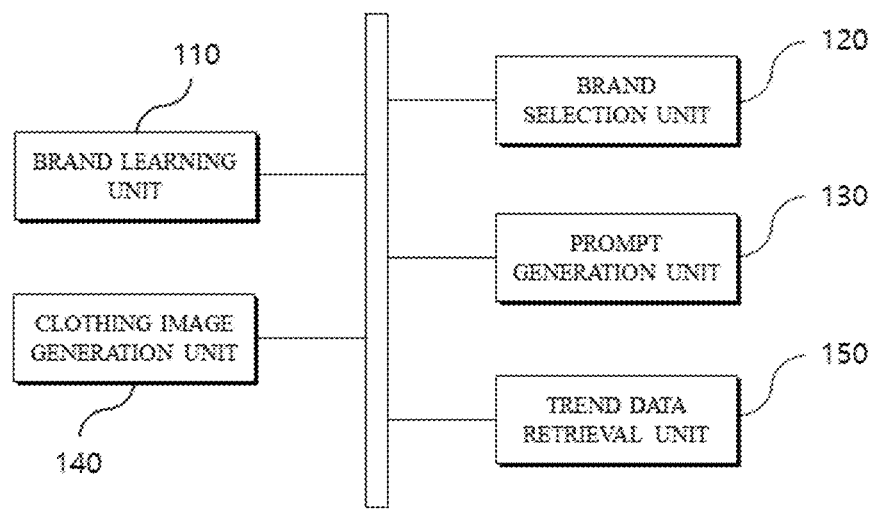
FIG. 1 is a block diagram showing a detailed configuration of a system for generating a customized design for a brand according to an embodiment of the present disclosure.

FIG. 1 is a block diagram showing a detailed configuration of a system 100 for generating a customized design for a brand according to an embodiment of the present disclosure. As shown in FIG. 1, the system 100 for generating a customized design for a brand according to an embodiment of the present disclosure according to an embodiment of the present disclosure includes a brand learning unit 110, a brand selection unit 120, a prompt generation unit 130, a clothing image generation unit 140, and a trend data retrieval unit 150.

The brand learning unit 110 learns a unique brand style for each brand based on a plurality of clothing images for each brand. In the present embodiments, a clothing image for each brand is an image of clothing produced by each brand, and may be a photograph or two-dimensional image of the clothing. Here, in a broad sense, clothing is used to encompass all fashion items such as tops, bottoms, one-piece dresses, jackets, hats, shoes, and the like.

Figure 2:
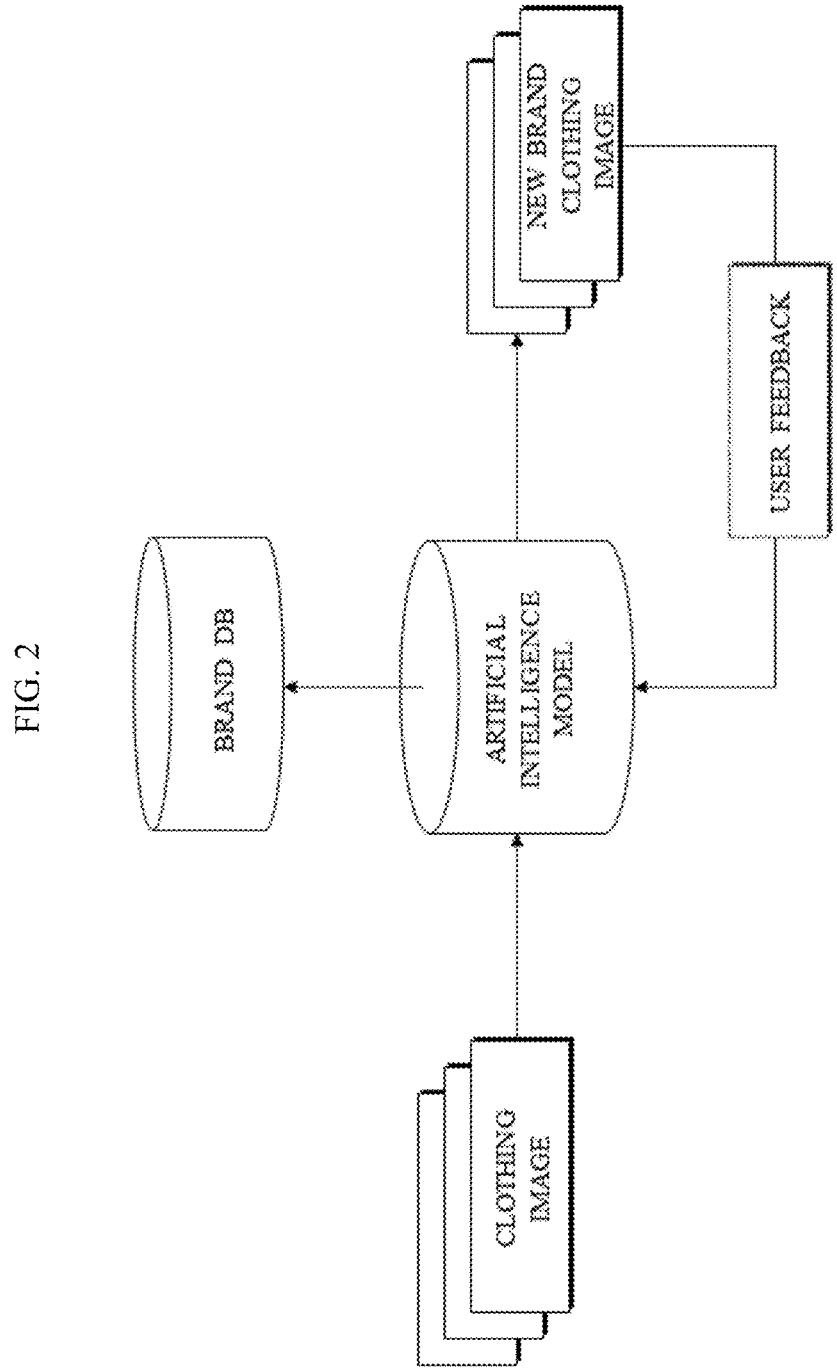
FIG. 2 is an example showing a process of learning a unique brand style for each brand by a brand learning unit according to an embodiment of the present disclosure.

FIG. 2 is an example showing a process of learning a unique brand style for each brand by the brand learning unit 110 according to an embodiment of the present disclosure.

Referring to FIG. 2, the brand learning unit 110 collects a plurality of clothing images for each brand to learn a unique brand style for each brand. As an example, the brand learning unit 110 may collect a plurality of clothing images corresponding to a specific brand from a business server (not shown) of a specific brand. In this case, the brand learning unit 110 may access an internal database of the business server and collect a large number of clothing images. As another example, the brand learning unit 110 may collect a plurality of clothing images for each brand from web pages specified online, such as portal sites, homepages, blogs, or the like.

Here, the brand learning unit 110 may dynamically adjust the ratio of a first clothing image collected from the business server of the specific brand and a second clothing image collected from the web page. When the relative weight of the first clothing image collected from the business server of the specific brand is relatively large compared to the relative weight of the second clothing image collected from the web page, the possibility that the clothing image generation unit 140 to be described below will generate a new clothing image that matches the brand's latest style increases. On the other hand, when the relative weight of the second clothing image collected from the above web page is relatively large compared to the relative weight of the first clothing image collected from the business server of the specific brand, the design diversity of new clothing images generated by the clothing image generation unit 140 increases. As the relative weight of second clothing images collected from the web page increases, the number of training images for the brand increases, and the diversity of design creation may also increase. The brand learning unit 110 may receive respective relative weights for the first and second clothing images from the user, and collect and learn each of the first and second clothing images according to the input relative weights.

Next, the brand learning unit 110 may collect the collected clothing images as training data and store them in each set brand database, and may generate new brand clothing images for each brand from a plurality of clothing images stored in each brand database. The brand learning unit 110 may learn properties of each of the plurality of clothing images stored in each brand database using an artificial intelligence model (a first artificial intelligence model), and may learn a unique brand style for each brand from the properties. Here, the artificial intelligence model may be implemented as, for example, a Retrieval-Augmented Generation (RAG) model. The RAG model is a private AI model specialized in a specific business area, and is advantageous in reflecting the latest information or providing more accurate data compared to general generative AI. The brand learning unit 110 may generate the new brand clothing images by changing the properties (e.g., the material, print, style, color, detail, sleeve length, neckline, collar, fit, shape, silhouette, and the like) of the plurality of clothing images stored in each brand database while maintaining the unique brand style for each brand that has been previously learned.

Next, the brand learning unit 110 may store the new brand clothing image as training data in the brand database corresponding to the new brand clothing image based on the similarity between the generated new brand clothing images and a plurality of clothing images stored in the brand database corresponding to the new brand clothing image. To this end, the brand learning unit 110 may compare the properties of the generated new brand clothing image with the properties of the plurality of clothing images stored in the brand database corresponding to the new brand clothing image, calculate the similarity between them, and when the similarity is higher than or than a reference value, store the new brand clothing image as training data in the brand database corresponding to the new brand clothing image.

In this case, the brand learning unit 110 may receive user feedback on the new brand clothing image and determine the similarity based on the user feedback. Here, the user feedback may be, for example, scoring information or grouping information regarding the new brand clothing images.

Figure 3:
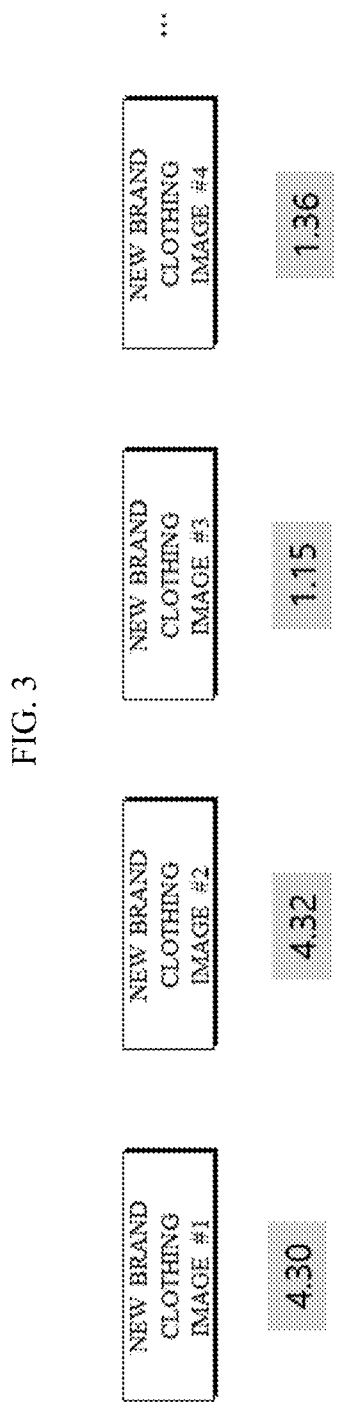
FIG. 3 is an example of user feedback on new brand clothing images generated by the brand learning unit according to an embodiment of the present disclosure.

FIG. 3 is an example of user feedback on new brand clothing images generated by the brand learning unit 110 according to an embodiment of the present disclosure.

Referring to FIG. 3, the brand learning unit 110 may receive scoring information regarding new brand clothing images from a user. Here, the scoring information is an indicator that quantitatively indicates how well the new brand clothing images are aligned with the unique brand style, and may be expressed as a number within a set range (for example, a number between 0 and 5). The user may enter a value closer to 5 as the user determines that the new brand clothing image is better aligned with the unique brand style, and enter a value closer to 0 as the user determines that the new brand clothing image is less aligned with the unique brand style. As an example, the user may enter scoring information of 4.30, 4.32, 1.15, and 1.36 for new brand clothing images #1, #2, #3, and #4, respectively. The brand learning unit 110 may, for example, store a new brand clothing image having scoring information higher than or equal to a reference value as training data in the brand database corresponding to the new brand clothing image, and discard a new brand clothing images having scoring information lower than the reference value.

Figure 4:
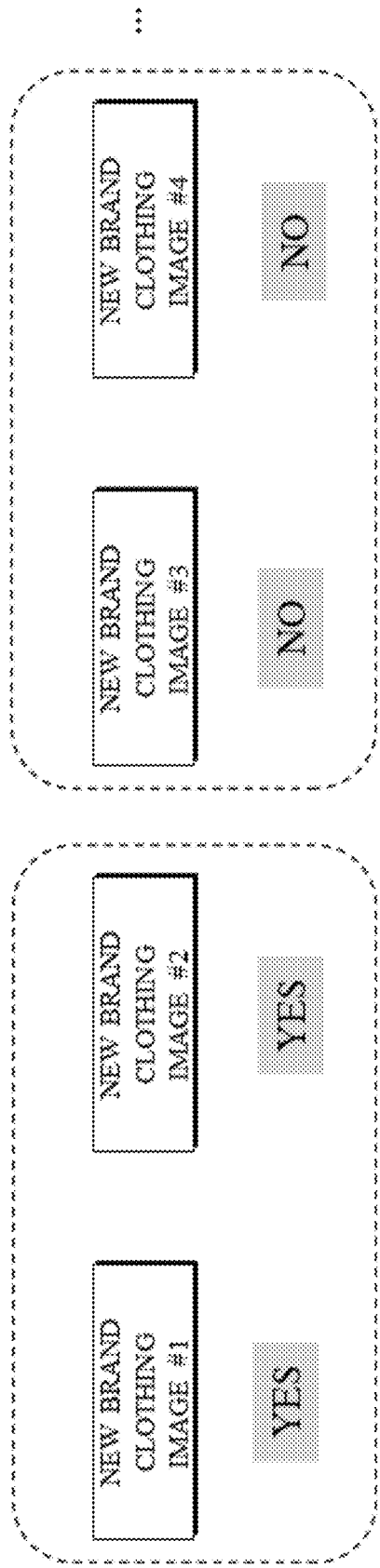
FIG. 4 is an example of user feedback on new brand clothing images generated by the brand learning unit according to another embodiment of the present disclosure.

FIG. 4 is an example of user feedback on new brand clothing images generated by the brand learning unit 110 according to another embodiment of the present disclosure.

Referring to FIG. 4, the brand learning unit 110 may receive grouping information on new brand clothing images from the user. Here, the grouping information is an indicator indicating whether the new brand clothing images may be grouped into a group having the same style as a plurality of clothing images stored in the brand database, and may be expressed as a set phrase indicating whether the grouping is possible, such as YES, NO, or the like. When the user determines that the new brand clothing images may be grouped into the group having the same style as a plurality of clothing images stored in the brand database, the user may enter the grouping information for the new brand clothing images as YES, and when the user determines that the new brand clothing images may not be grouped into the group having the same style as the plurality of clothing images stored in the brand database, the user may enter the grouping information for the new brand clothing images as NO. The brand learning unit 110 may, for example, store new brand clothing images having grouping information entered as YES as training data in the brand database corresponding to the new brand clothing images, and discard new brand clothing images having grouping information entered as NO.

In this way, the brand learning unit 110 may verify the new brand clothing images through a similarity comparison or user feedback for the new brand clothing images, and when it is determined, as a verification result, that a new brand clothing image is aligned with the unique brand style, store the new brand clothing image as training data in the brand database corresponding to the new brand clothing image. This process may increase the number of pieces of training data stored in the brand database, and also increase the design diversity of the training data.

Referring back to FIG. 1, the brand selection unit 120 allows the user to select one of a plurality of brands. The brand selection unit 120 may output a plurality of pieces of brand information and the user may select one of the plurality of pieces of output brand information. As an example, the brand selection unit 120 may allow the user to select one among Brand A, Brand B, Brand C, and Brand D. As described below, the clothing image generation unit 140 may generate a new clothing image to be aligned with the brand selected by the user.

The prompt generation unit 130 receives a user prompt required for generating a new clothing image from the user or automatically generates a user prompt based on the selected brand. Here, the user prompt may be a combination of keywords regarding properties of a clothing image required for generating a new clothing image. An example of the user prompt is shown below.

Example 1 of User Prompt

Casual Knit Pullover: This relaxed-fit pullover features a collared neckline, long sleeves, and a hip-length cut. Crafted from soft knit fabric in a neutral cream color, it offers a minimalist aesthetic.

Example 2 of User Prompt

Men's Oversized Striped Dress Shirt with necktie: This oversized dress shirt features a classic collar, long sleeves, and a relaxed fit. Crafted from lightweight cotton, it showcases a subtle striped pattern in monochrome tones, exuding modern sophistication.

As an example, the user may directly input a user prompt regarding the new clothing image the user wishes to generate. The user may input, as the user prompt, for example, a combination of a plurality of keywords related to properties of the new clothing image the user wishes to generate. In addition, the prompt generation unit 130 may receive the image prompt from the user and automatically generate a user prompt from the image prompt. For example, the user may input, as the image prompt, an image that may be used as a reference for generating a new clothing image. The prompt generation unit 130 may automatically generate the user prompt including the combination of a plurality of keywords from the properties of the input image prompt.

As another example, the prompt generation unit 130 may automatically generate the user prompt based on a brand selected by the user instead of receiving the combination of a plurality of keywords or the image prompt from the user.

To this end, the prompt generation unit 130 may select and output a plurality of different clothing images corresponding to the selected brand. As an example, the prompt generation unit 130 may randomly select and output a plurality of different clothing images corresponding to the selected brand. As another example, the prompt generation unit 130 may classify clothing images corresponding to the selected brand according to set clothing categories (e.g., one-piece dresses, jeans, jackets, and the like) and select and output a plurality of clothing images corresponding to each different clothing category. For example, the prompt generation unit 130 may select and output each of a clothing image corresponding to the one-piece dress, a clothing image corresponding to jeans, and a clothing image corresponding to the jacket. The prompt generation unit 130 may select and output a plurality of clothing images in different combinations each time according to a user request.

Then, the prompt generation unit 130 may receive a selection from the user for one of the plurality of output clothing images and automatically generate the user prompt described above based on the selected clothing image. Specifically, the prompt generation unit 130 may extract a plurality of properties of the selected clothing image and automatically generate a user prompt including a combination of a plurality of keywords from the extracted properties of the clothing image.

In addition, the prompt generation unit 130 may regenerate the user prompt by receiving from the user a modification command for at least one of the plurality of keywords included in the user prompt or an additional command for a new keyword.

In Example 2 of the user prompt, the prompt generation unit 130 may receive the modification command from the user to modify "long sleeves" among the plurality of keywords included in the user prompt to "short sleeves" and regenerate the user prompt as follows.

Example 2' of User Prompt

Men's Oversized Striped Dress Shirt with necktie: This oversized dress shirt features a classic collar, short sleeves, and a relaxed fit. Crafted from lightweight cotton, it showcases a subtle striped pattern in monochrome tones, exuding modern sophistication.

In this way, according to embodiments of the present disclosure, the user prompt may be generated in various ways, and in particular, the user prompt may be automatically generated based on a plurality of clothing images corresponding to the selected brand without the user having to input user prompts one by one, thereby minimizing inconvenience of the user in generating new clothing images.

The clothing image generation unit 140 generates a new clothing image based on a set artificial intelligence model (second artificial intelligence model), training data corresponding to the brand selected by the user, and the user prompt. In the present embodiments, the new clothing image is interpreted in a broad sense to include not only an image that visually represents the new design, but also design ideas for the new design. The above artificial intelligence model is a model that automatically generates and outputs a first new clothing image and a second new clothing image, which will be described below, by comprehensively considering the brand selected by the user, competitor data corresponding to the selected brand, user prompts, trend data, and the like, and may be configured to generate and suggest new clothing images on its own through an inference function such as OpenAI o1's Chain-of-Thought. Unlike existing models that immediately output answers to questions, OpenAI o1 is an artificial intelligence model that analyzes the problem, seeks various solutions, and then provides answers through comprehensive thinking, and goes through a process similar to the process in which people think of various strategies and develop their thinking through trial and error before solving a problem.

Specifically, the clothing image generation unit 140 may, for example, select training data that includes the most keywords for properties of the clothing image included in the user prompt in training data corresponding to the brand selected by the user, and automatically generate the first new clothing image by changing properties of a clothing image that are not included in the user prompt based on the selected training data. In addition, the clothing image generation unit 140 may automatically generate the first new clothing image by, for example, changing the properties of the clothing image included in the user prompt from the selected training data within a first range, and changing the properties of the clothing image not included in the user prompt from the selected training data within a second range greater than the first range. In this way, the first new clothing image is generated based on training data corresponding to the brand selected by the user, so that the first new clothing image is aligned with the unique brand style. In addition, the clothing image generation unit 140 may automatically generate the second new clothing image by modifying the first new clothing image based on trend data retrieved by the trend data retrieval unit 150, as described below.

The trend data retrieval unit 150 retrieves and outputs a plurality of pieces of trend data based on the brand selected by the user and the user prompt, and receives a selection from the user for one of the plurality of pieces of output trend data. In the present embodiments, the trend data is data on the latest fashion trends that are popular or expected to be popular during a set period of time, and may be collected from a set online platform or website. Such trend data may include, for example, fashion show trend data, paper trend data, magazine trend data, competitor trend data, social network service (SNS) trend data, blog trend data, and the like, and may include text, images, graphs, and the like.

Specifically, the trend data retrieval unit 150 may retrieve and output a plurality of pieces of trend data based on a plurality of keywords included in a user prompt. As an example, when the user prompt includes keywords such as "classic collar", "long sleeves", "relaxed fit", or the like, the trend data retrieval unit 150 may retrieve and output a plurality of pieces of trend data containing the keywords from the set online platform or website. Here, the trend data retrieval unit 150 may be configured to retrieve only trend data posted on the online platform or website during a set period.

In this case, the trend data retrieval unit 150 may dynamically change retrieval criteria or retrieval priorities for the plurality of pieces of trend data according to the brand selected by the user.

As an example, when the brand selected by the user is Brand A, the trend data retrieval unit 150 may retrieve and output a plurality of pieces of trend data by giving the fashion show trend data the highest retrieval priority among the fashion show trend data, the paper trend data, the magazine trend data, the competitor trend data, the SNS trend data, and the blog trend data.

As another example, when the brand selected by the user is Brand B, the trend data retrieval unit 150 may retrieve and output only trend data for Brand C, which is a competitor of Brand B, that is, competitor trend data.

Since the type or relative weight of trend data used as a reference may vary for each brand when generating a new clothing design, in the present disclosure, a plurality of pieces of trend data are retrieved and output based on a plurality of keywords included in the user prompt, and the retrieval criteria or retrieval priorities for the plurality of pieces of trend data are dynamically changed depending on the selected brand, thereby enabling new clothing designs to be generated by considering trend data suitable for each brand.

In addition, the trend data retrieval unit 150 may receive information on a sales country or sales market of a fashion product corresponding to the new clothing image from the user, and may dynamically change the retrieval criteria or retrieval priorities for the plurality of pieces of trend data according to the information on the sales country or sales market.

Since the type or relative weight of trend data used as a reference when generating a new clothing design may vary for each sales country or sales market of the fashion product, the trend data retrieval unit 150 may dynamically change the retrieval criteria or retrieval priorities for the plurality of pieces of trend data based on information on the sales country or sales market of the fashion product input by the user as well as the selected brand. In this case, the trend data retrieval unit 150 may assign weights for each piece of information on a brand, sales country or sales market in the process of dynamically changing the retrieval criteria or retrieval priorities for trend data, and these weights may be input by the user. In addition, the trend data retrieval unit 150 may learn weights for each piece of information on the brand, sales country or sales market each time the trend data retrieval unit 150 receives the weights from the user and then automatically determine the weights based on previously learned results when information on the same brand, sales country or sales market is input. For example, when the weights for Brand A—Country of Sale Japan, which are 0.7 and 0.3, are repeatedly input more than a set number of times, the trend data retrieval unit 150 may determine the weights for Brand A—Country of Sale Japan input by the user as 0.7 and 0.3, respectively.

Then, the clothing image generation unit 140 modifies the first new clothing image so that the selected trend data is reflected, and generates the second new clothing image. Specifically, the clothing image generation unit 140 may select keywords related to the properties of the clothing image from the selected trend data, and may modify the first new clothing image so that the properties of the clothing image according to the selected keywords are reflected, and generate the second new clothing image. As an example, the clothing image generation unit 140 may generate the second new clothing image by modifying the neckline and sleeve length of the first new clothing image to be aligned with the selected trend data. That is, according to embodiments of the present disclosure, by learning the unique brand style for each brand, and generating the first new clothing image based on the brand selected by the user and the user prompt, and then modifying the first new clothing image into the second new clothing image by reflecting the latest trend data related thereto, it is possible to automatically generate a brand-customized design that satisfies both the unique brand style and the latest trend.

In addition, the clothing image generation unit 140 may derive main keywords corresponding to the selected brand in order to determine the brand aesthetics of the selected brand, and perform an open space analysis based on the derived main keywords and competitor trend data included in the plurality of pieces of trend data, thereby determining a brand gap of the selected brand and automatically generating the second new clothing image corresponding to the brand gap.

In the present embodiments, the main keywords refer to keywords that are used to define the brand, such as a clothing category, clothing property, style, age group of target customers, competitor name, or the like, or are used to indicate the current position of the corresponding brand in the market, and may be, for example, versatile, polished workwear, stretch fabrics, comfort style, and the like.

The clothing image generation unit 140 may derive the above-described main keywords based on the brand database corresponding to the selected brand. Then, the clothing image generation unit 140 may determine the brand gap of the selected brand by performing the open space analysis based on the derived main keywords and competitor trend data included in the plurality of pieces of trend data. Open space refers to a market gap in the market that is not filled by the brand. In addition, the open space analysis is intended to find a market gap in the market that the brand is not occupying, more specifically to explore new business models, pipelines or products, and blue ocean opportunities for the corresponding brand. The clothing image generation unit 140 may extract competitor trend data corresponding to the selected brand based on the trend data, and may derive main keywords corresponding to the competitor (e.g., Semi-fitted to relaxed silhouettes, Neutral tones like grey, Minimalist details, or the like) from the competitor trend data. The clothing image generation unit 140 may perform the open space analysis based on the main keywords of the selected brand and the main keywords of the competitor to determine the brand gap other than the main keywords of the selected brand and the main keywords of the competitor. In this case, the clothing image generation unit 140 may derive the latest fashion trend attributes from the trend data, and determine fashion trend attributes that do not correspond to the main keywords of the selected brand and the main keywords of the competitor among the derived fashion trend attributes as the brand gap. The fashion trend attributes and the brand gap refer to various elements required to generate new clothing images, such as the clothing category, clothing property, style, target customer age group, and the like.

In this way, according to embodiments of the present disclosure, by determining the brand gap of the brand and automatically generating a new clothing image corresponding to the brand gap through the open space analysis of trend data, it is possible to automatically generate and suggest a design suitable for the market gap of the market not occupied by the brand.

In addition, whenever the first new clothing image or the second new clothing image is generated, the clothing image generation unit 140 may automatically calculate the cost required to produce the first new clothing image or the second new clothing image from production information about the properties of the first new clothing image or the second new clothing image and the materials used to produce the same, and display the cost on a screen. Accordingly, the user may check the cost required to produce the first new clothing image or the second new clothing image and refer to the cost during the process of generating the new clothing image.

Figure 5:
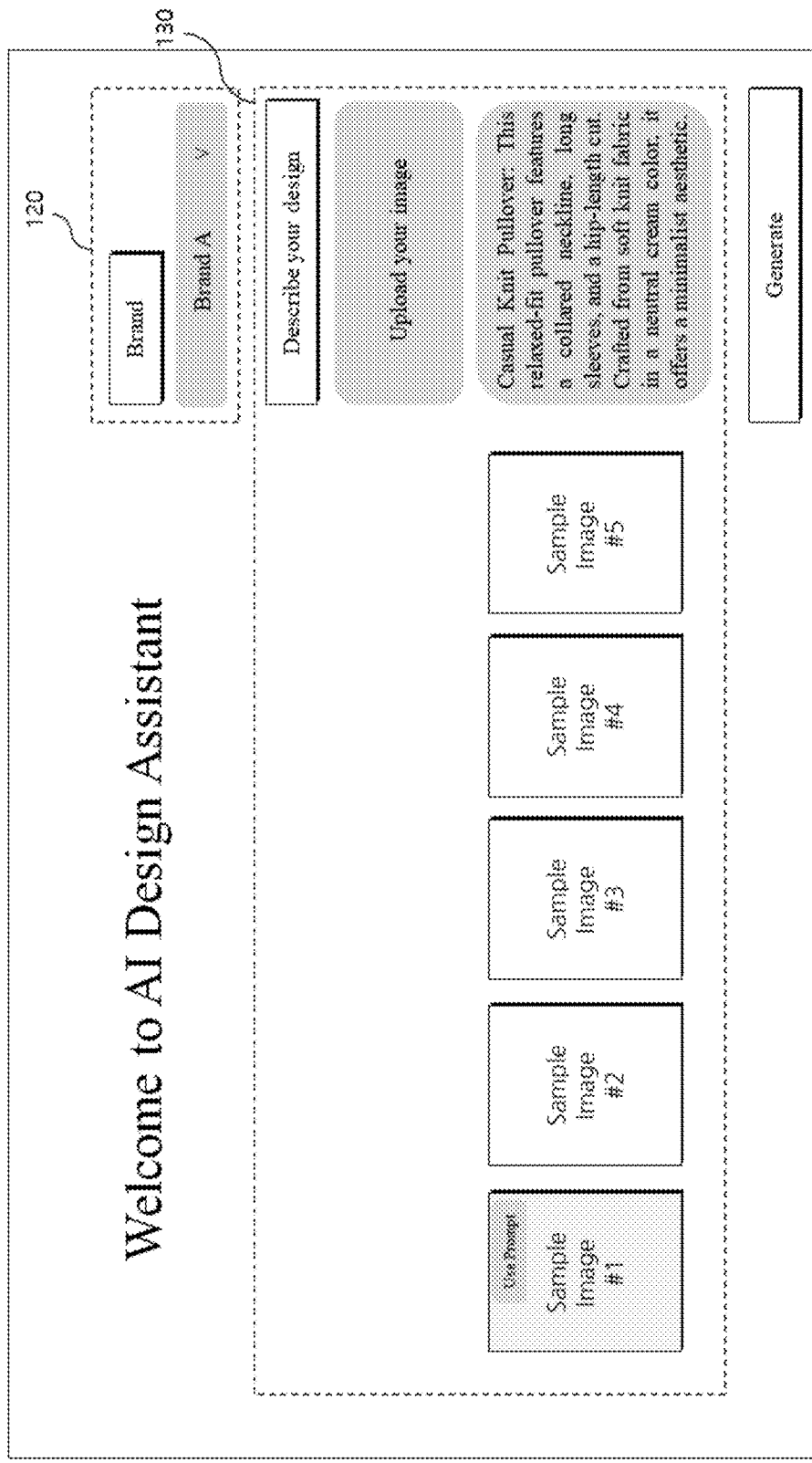
FIG. 5 is an example of a screen of the system for generating a customized design for a brand according to an embodiment of the present disclosure.
Figure 6:
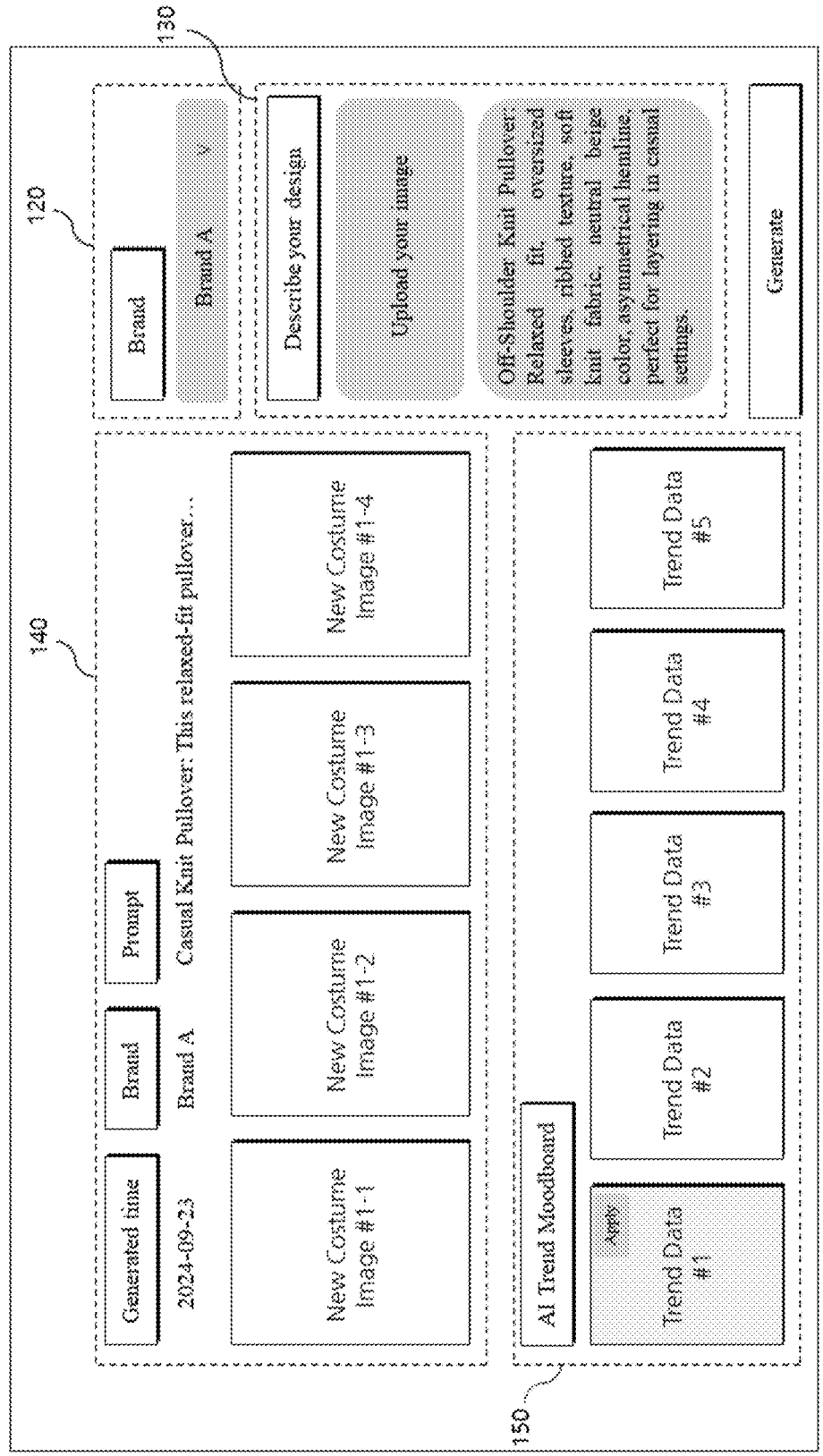
FIG. 6 is an example of a screen of the system for generating a customized design for a brand according to an embodiment of the present disclosure.
Figure 7:
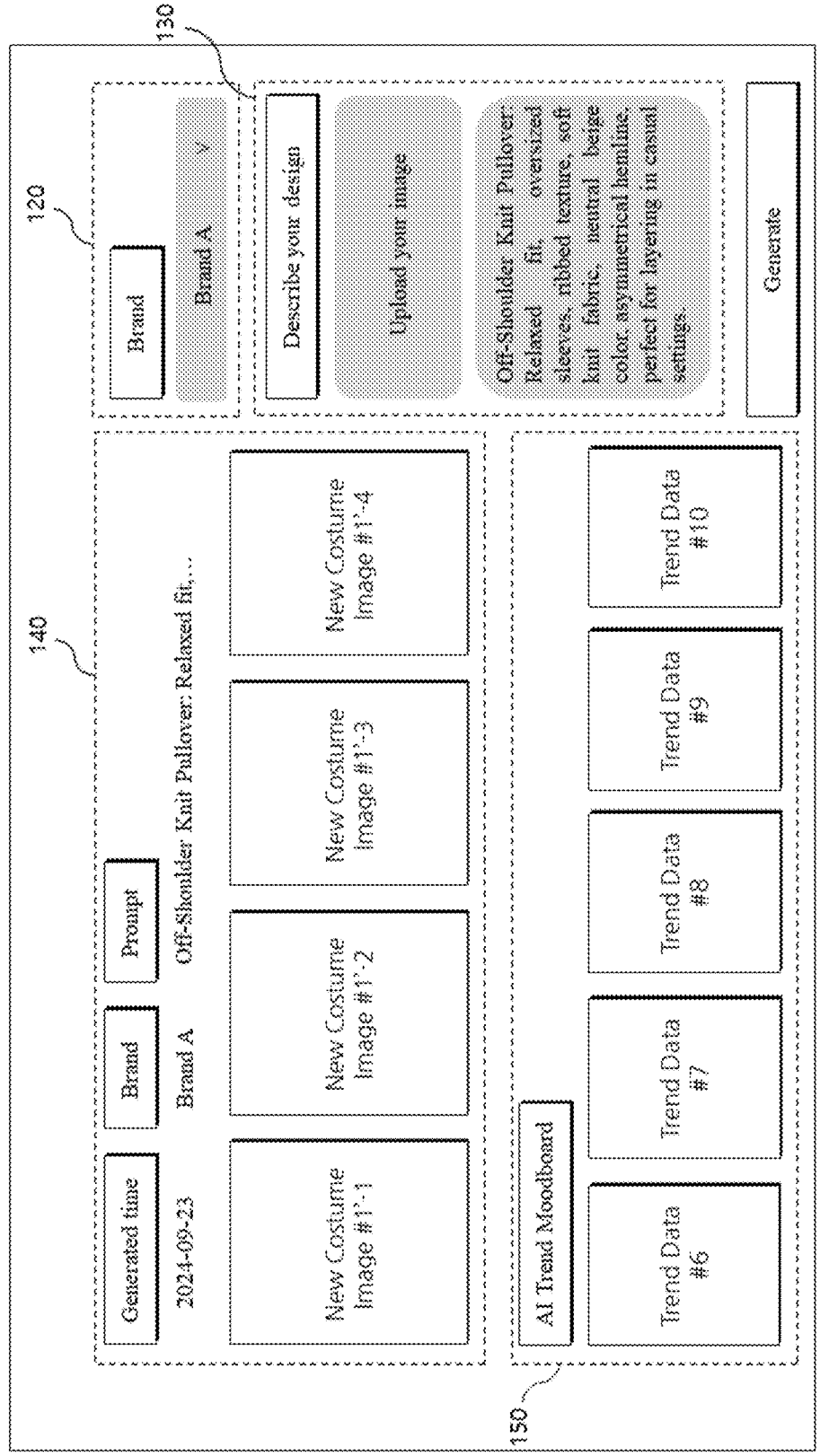
FIG. 7 is an example of a screen of the system for generating a customized design for a brand according to an embodiment of the present disclosure.

FIGS. 5 to 7 are screen examples of a system for generating a customized design for a brand according to an embodiment of the present disclosure.

First, referring to FIG. 5, the brand selection unit 120 may allow the user to select one of a plurality of brands. Here, for convenience of description, it is assumed that the user has selected Brand A.

Then, the prompt generation unit 130 may select and output a plurality of different clothing images corresponding to the selected brand. Here, it is assumed that the prompt generation unit 130 selects and outputs sample images #1 to #5. In this case, the sample images #1 to #5 may be clothing images stored in the brand database of Brand A as shown in FIG. 2.

The prompt generation unit 130 may receive a selection from the user for one of the plurality of output clothing images and automatically generate the user prompt based on the selected clothing image. As an example, a user may select the sample image #1, and in this case, a user prompt as described below may be automatically generated:

Casual Knit Pullover: This relaxed-fit pullover features a collared neckline, long sleeves, and a hip-length cut. Crafted from soft knit fabric in a neutral cream color, it offers a minimalist aesthetic.

Then, the user may request the generation of a first new clothing image by clicking the Generate button on the screen. In this case, the clothing image generation unit 140 may generate the first new clothing image based on a set artificial intelligence model, training data corresponding to the selected brand, and the user prompt.

Meanwhile, the "Upload your image" button shown in FIG. 5 represents an interface for receiving the image prompt described above from the user in the prompt generation unit 130. As described above, the user may input, as the image prompt, an image that may be used as a reference for generating a new clothing image. The prompt generation unit 130 may automatically generate the user prompt including the combination of a plurality of keywords from the properties of the input image prompt.

Referring to FIG. 6, the first new clothing images generated by the clothing image generation unit 140 are shown as New Costume Image #1-1, New Costume Image #1-2, New Costume Image #1-3, and New Costume Image #1-4. New Costume Image #1-1, New Costume Image #1-2, New Costume Image #1-3, and New Costume Image #1-4 may each be, for example, an image of a model wearing the clothing in different poses, an image of different models wearing the costume, images of models wearing the costume combined with different clothing images, or the like.

In addition, the trend data retrieval unit 150 may retrieve and output a plurality of pieces of trend data (e.g., Trend Data #1 to #5) based on the selected brand and user prompt, and may receive a selection from the user for one of the plurality of pieces of output trend data. Here, for convenience of description, it is assumed that the user has selected Trend Data #1.

In this case, the prompt generation unit 130 may select a combination of keywords corresponding to the pieces of selected trend data as follows.

Off-Shoulder Knit Pullover: Relaxed fit, oversized sleeves, ribbed texture, soft knit fabric, neutral beige color, asymmetrical hemline, perfect for layering in casual settings.

The combination of keywords may be utilized as a new user prompt.

The user may request the generation of a second new clothing image by clicking the Generate button on the screen. In this case, the clothing image generation unit 140 may modify the first new clothing image so that the selected trend data is reflected, and generate the second new clothing image.

Referring to FIG. 7, the second new clothing images generated by the clothing image generation unit 140 are shown as New Costume Image #1'-1, New Costume Image #1'-2, New Costume Image #1'-3, and New Costume Image #1'-4. New Costume Image #1'-1, New Costume Image #1'-2, New Costume Image #1'-3, and New Costume Image #1'-4 are different clothing images from New Costume Image #1-1, New Costume Image #1-2, New Costume Image #1-3, and New Costume Image #1-4 shown in FIG. 6, respectively, and are new images in which the trend data described above (Off-Shoulder Knit Pullover: Relaxed fit, oversized sleeves, ribbed texture, soft knit fabric, neutral beige color, asymmetrical hemline, perfect for layering in casual settings.) is reflected.

In this state, the trend data retrieval unit 150 may retrieve and output a plurality of pieces of trend data (e.g., Trend Data #6 to #10) different from the pieces of trend data shown in FIG. 6 based on the selected brand and the user prompt. If the user selects one of the plurality of pieces of trend data shown in FIG. 7 and then clicks the Generate button on the screen, the clothing image generation unit 140 may regenerate a second new clothing image by modifying the first new clothing image again so that the pieces of selected trend data is reflected.

In this way, the clothing image generation unit 140 may generate the second new clothing image differently each time according to a user's request.

In addition, as described above, the clothing image generation unit 140 may determine the brand gap of the brand through open space analysis of trend data and automatically generate a new clothing image corresponding to the brand gap.

Figure 8:
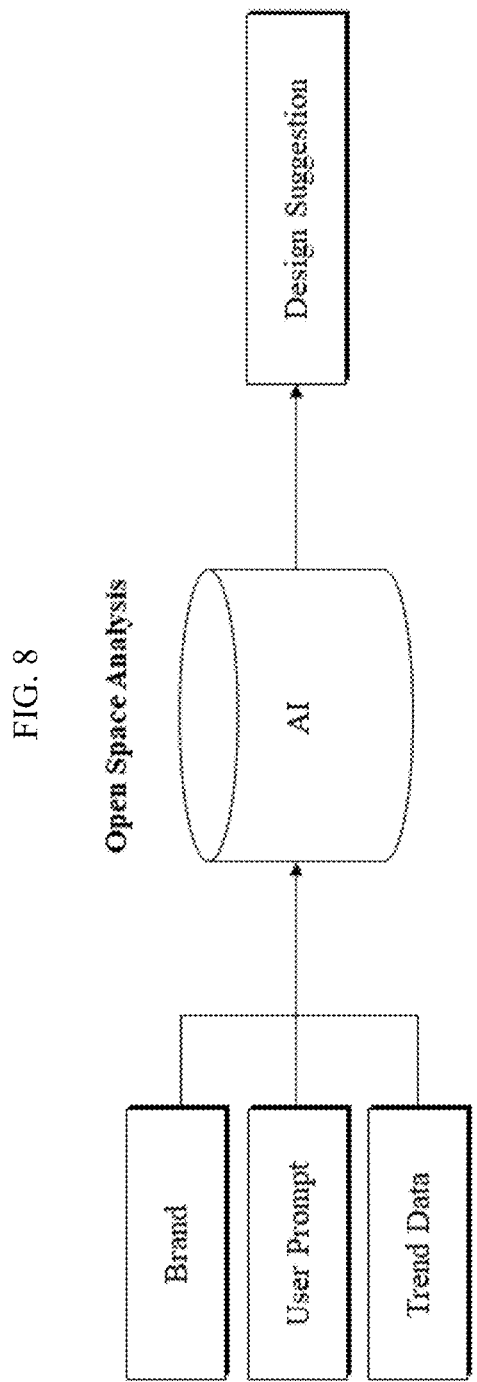
FIG. 8 is a diagram showing an example of generating and suggesting a new clothing image through open space analysis in a clothing image generation unit according to an embodiment of the present disclosure.

FIG. 8 is a diagram showing an example of generating and suggesting a new clothing image through open space analysis in the clothing image generation unit 140 according to an embodiment of the present disclosure, and FIG. 9 is a view showing an example of deriving main keywords for determining brand aesthetics in the clothing image generation unit 140 according to an embodiment of the present disclosure.

Referring to FIG. 8, an artificial intelligence model used to generate the new clothing image may generate and suggest a new clothing image on its own through a comprehensive thought process based on brand, user prompts, and trend data by going beyond existing models that simply output answers through inference functions of OpenAI o1.

In addition, referring to FIG. 9, the clothing image generation unit 140 may derive main keywords corresponding to the selected brand. Here, the main keywords may be, for example, versatile, polished casual, and the like.

Figure 10:
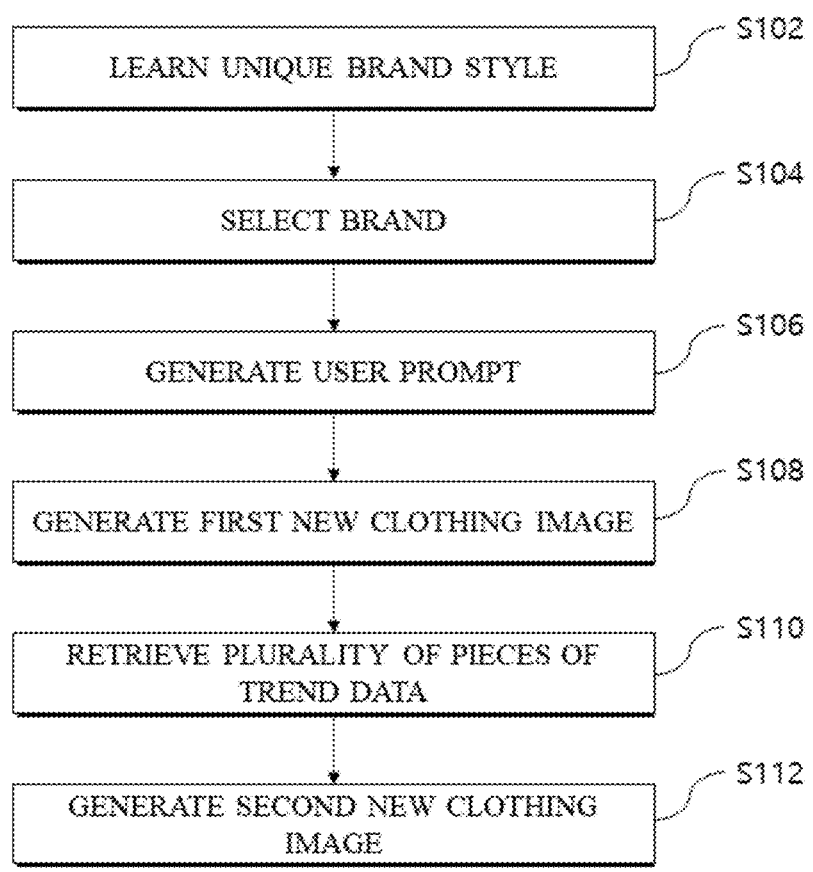
FIG. 10 is a flowchart for describing a method for generating a customized design for a brand according to an embodiment of the present disclosure.

FIG. 10 is a flowchart for explaining a method for generating a customized design for a brand according to an embodiment of the present disclosure. In the illustrated flowchart, the method is divided into a plurality of steps; however, at least some of the steps may be performed in a different order, performed together in combination with other steps, omitted, performed in subdivided steps, or performed by adding one or more steps not illustrated.

In operation S102, the brand learning unit 110 learns a unique brand style for each brand based on a plurality of clothing images for each brand.

In operation S104, the brand selection unit 120 allows the user to select one of a plurality of brands.

In operation S106, the prompt generation unit 130 receives a user prompt required for generating a new clothing image from the user or automatically generates a user prompt based on the selected brand.

In operation S108, the clothing image generation unit 140 generates a first new clothing image based on a set artificial intelligence model, training data corresponding to the selected brand, and the user prompt.

In operation S110, the trend data retrieval unit 150 retrieves a plurality of pieces of trend data based on the selected brand and the user prompt.

In operation S112, the clothing image generation unit 140 automatically generates a second new clothing image by modifying the first new clothing image so that the trend data is reflected through the artificial intelligence model.

Figure 11:
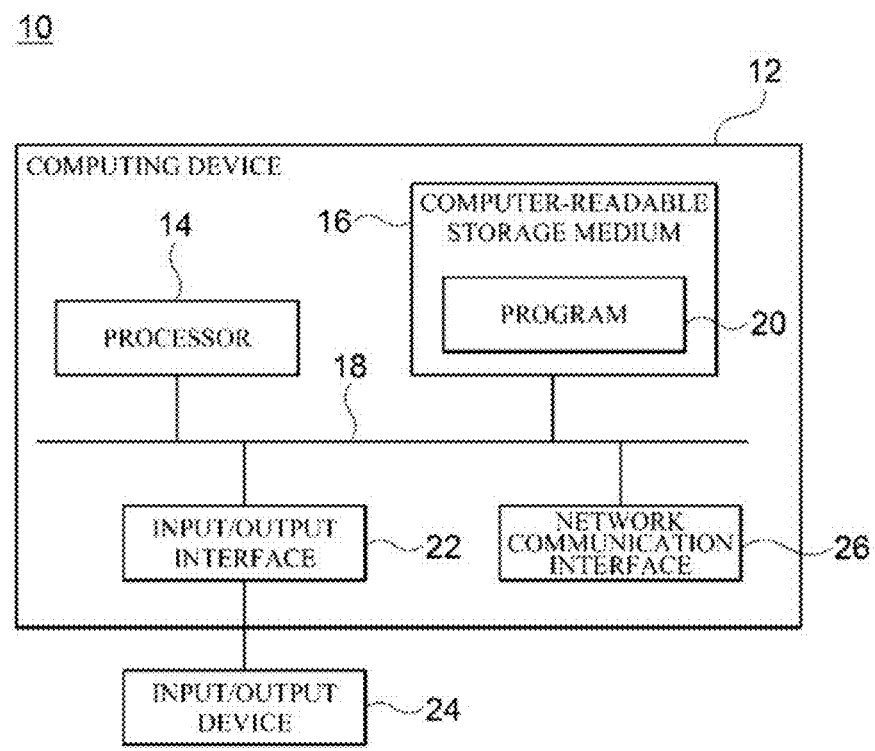
FIG. 11 is a block diagram illustrating a computing environment including a computing device suitable for use in exemplary embodiments.

FIG. 11 is a block diagram illustrating a computing environment including a computing device suitable for use in exemplary embodiment. In the illustrated embodiment, respective components may have different functions and capabilities other than those described below, and may include additional components in addition to those described below.

An illustrated computing environment 10 includes a computing device 12. In an embodiment, the computing device 12 may be the system 100 for generating a customized design for a brand, or one or more components included in the system 100 for generating a customized design for a brand.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In an embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, it is possible to learn a unique brand style for each brand and then automatically generate a user prompt based on a brand selected by a user, and automatically generate and suggest a new clothing image by comprehensively considering the selected brand, the user prompt, and trend data. In particular, an artificial intelligence model used to generate the new clothing image can generate and suggest a new clothing image on its own through a comprehensive thought process based on brand, user prompts, and trend data by going beyond existing models that simply output answers through inference functions such as Chain of Thought of OpenAI o1. In this case, users can easily obtain new brand customized clothing images that reflect the latest trends simply by entering the brand, and a user's inconvenience and the time and cost required in the new design production process can be minimized.

In addition, according to embodiments of the present disclosure, by dynamically changing retrieval criteria or retrieval priorities for trend data according to a brand selected by a user, trend data suitable for the brand can be retrieved and utilized to generate new clothing images.

In addition, according to embodiments of the present disclosure, by determining a brand's brand gap and automatically generating a new clothing image corresponding to the brand gap through an open space analysis of trend data and competitor data, it is possible to automatically generate and suggest a design suitable for a market gap of the market not occupied by the brand.

Although the present disclosure has been described in detail through the representative embodiments as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A system for generating a customized design for each brand based on artificial intelligence, the system comprising:
   a brand learning unit configured to learn a unique brand style for each brand based on a plurality of clothing images of each brand;
   a brand selection unit configured to allow a user to select one of the plurality of brands;
   a prompt generation unit configured to automatically generate a user prompt required to generate a new clothing image based on the selected brand;
   a clothing image generation unit configured to automatically generate a first new clothing image based on a set artificial intelligence model, training data corresponding to the selected brand, and the user prompt; and
   a trend data retrieval unit configured to retrieve a plurality of pieces of trend data based on the selected brand and the user prompt,
   wherein the clothing image generation unit automatically generates a second new clothing image by modifying the first new clothing image so that the trend data is reflected through the artificial intelligence model, and
   the prompt generation unit selects and outputs a plurality of different clothing images corresponding to the selected brand, receives a selection from the user for one of the plurality of output clothing images, and automatically generates the user prompt based on the selected clothing image,
   wherein the plurality of pieces of trend data include at least one of fashion show trend data, paper trend data, magazine trend data, competitor trend data, social network service (SNS) trend data, and blog trend data related to the selected brand or the plurality of keywords included in the user prompt, and
   wherein the clothing image generation unit derives main keywords corresponding to the selected brand in order to determine brand aesthetics of the selected brand, and perform an open space analysis based on the derived main keywords and competitor trend data included in the plurality of pieces of trend data, thereby determining a brand gap of the selected brand and automatically generating the second new clothing image corresponding to the brand gap.

2. The system of claim 1, wherein the brand learning unit is configured to collect the plurality of clothing images for each brand as the training data and stores the clothing images in each set brand database, generate a new brand clothing image for each brand from the plurality of clothing images stored in each brand database, and store the new brand clothing image as the training data in the brand database corresponding to the new brand clothing image based on a similarity between the new brand clothing image and the plurality of clothing images stored in the brand database corresponding to the new brand clothing image.

3. The system of claim 1, wherein the prompt generation unit is configured to extract a plurality of properties of the selected clothing image and automatically generate the user prompt from a combination of keywords for the properties of the extracted clothing image.

4. The system of claim 3, wherein the prompt generation unit is configured to receive, from the user, a modification command for at least one of the plurality of keywords included in the user prompt or an additional command for a new keyword and regenerates the user prompt.

5. The system of claim 1, wherein the trend data retrieval unit is configured to dynamically change retrieval criteria or retrieval priorities for the plurality of pieces of trend data according to the selected brand.

6. The system of claim 1 wherein the trend data retrieval unit is configured to receives a selection from the user for one of the plurality of pieces of trend data, and
the clothing image generation unit is configured to automatically generate the second new clothing image based on the pieces of trend data selected from the user through the artificial intelligence model.

7. A method for generating a customized design for each brand based on artificial intelligence, the method comprising:
learning, by a brand learning unit, a unique brand style for each brand based on a plurality of clothing images of each brand;
allowing, by a brand selection unit, a user to select one of the plurality of brands;
automatically generating, by a prompt generation unit, a user prompt required to generate a new clothing image based on the selected brand;
automatically generating, by a clothing image generation unit, a first new clothing image based on a set artificial intelligence model, training data corresponding to the selected brand, and the user prompt;
retrieving, by a trend data retrieval unit, a plurality of pieces of trend data based on the selected brand and the user prompt; and
generating, by the clothing image generation unit, a second new clothing image by modifying the first new clothing image so that the trend data is reflected through the artificial intelligence model,
wherein the plurality of pieces of trend data include at least one of fashion show trend data, paper trend data, magazine trend data, competitor trend data, social network service (SNS) trend data, and blog trend data related to the selected brand or the plurality of keywords included in the user prompt, and
wherein the generating of the second new clothing image includes deriving main keywords corresponding to the selected brand in order to determine brand aesthetics of the selected brand, and performing an open space analysis based on the derived main keywords and competitor trend data included in the plurality of pieces of trend data, thereby determining a brand gap of the selected brand and automatically generating the second new clothing image corresponding to the brand gap.

8. The method of claim 7, wherein the learning of the unique brand style for each brand includes collecting a plurality of clothing images for each brand as the training data and storing the clothing images in each set brand database, generating a new brand clothing image for each brand from the plurality of clothing images stored in each brand database, and storing the new brand clothing image as the training data in the brand database corresponding to the new brand clothing image based on a similarity between the new brand clothing image and the plurality of clothing images stored in the brand database corresponding to the new brand clothing image.

9. The method of claim 7, wherein the automatic generation of the user prompt includes extracting a plurality of properties of the selected clothing image and automatically generating the user prompt from a combination of keywords for the properties of the extracted clothing image.

10. The method of claim 9, wherein the automatic generation of the user prompt includes receiving, from the user, a modification command for at least one of the plurality of keywords included in the user prompt or an additional command for a new keyword and regenerating the user prompt.

11. The method of claim 7, wherein the retrieving of the plurality of pieces of trend data includes dynamically changing retrieval criteria or retrieval priorities for the plurality of pieces of trend data according to the selected brand.

12. The method of claim 7, wherein the retrieving of the plurality of pieces of trend data includes receiving a selection from the user for one of the plurality of pieces of trend data, and
the generating of the second new clothing image includes automatically generating the second new clothing image based on the pieces of trend data selected from the user through the artificial intelligence model.

* * * * *